(12) United States Patent
Saji et al.

(10) Patent No.: US 10,239,134 B2
(45) Date of Patent: Mar. 26, 2019

(54) TOOL BODY AND CUTTING TOOL

(71) Applicant: TUNGALOY CORPORATION, Fukushima (JP)

(72) Inventors: Ryuichi Saji, Iwaki (JP); Satoru Yoshida, Iwaki (JP); Yuki Oikawa, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 82 days.

(21) Appl. No.: 15/520,309

(22) PCT Filed: May 17, 2016

(86) PCT No.: PCT/JP2016/064619
§ 371 (c)(1),
(2) Date: Apr. 19, 2017

(87) PCT Pub. No.: WO2016/186112
PCT Pub. Date: Nov. 24, 2016

(65) Prior Publication Data
US 2017/0326656 A1    Nov. 16, 2017

(30) Foreign Application Priority Data

May 19, 2015  (JP) .................................. 2015-101453

(51) Int. Cl.
| | | |
|---|---|---|
| B23C 5/10 | (2006.01) | |
| B23C 5/24 | (2006.01) | |
| B23C 5/22 | (2006.01) | |

(52) U.S. Cl.
CPC ............ B23C 5/109 (2013.01); B23C 5/2221 (2013.01); B23C 5/2472 (2013.01);
(Continued)

(58) Field of Classification Search
CPC .......... B23C 2200/165; B23C 2210/16; B23C 2210/168; B23C 5/109; B23C 5/2221
See application file for complete search history.

(56) References Cited

U.S. PATENT DOCUMENTS 1,838,520 A * 12/1931 Archer ................ B23B 27/1614
                                               407/104
3,268,977 A * 8/1966 Diemond .............. B23B 27/167
                                               407/103
(Continued)

FOREIGN PATENT DOCUMENTS

EP      3266547 A1    1/2018
JP     H11-509484 A   8/1999
(Continued)

OTHER PUBLICATIONS

International Search Report; PCT/JP2016/064619 dated Jul. 19, 2016.
(Continued)

*Primary Examiner* — Sara Addisu
(74) *Attorney, Agent, or Firm* — Studebaker & Brackett PC

(57) ABSTRACT

The present invention relates to a tool body provided with at least one insert seat. The insert seat includes a bottom wall surface and a side wall surface. The side wall surface includes a first side wall surface and a second side wall surface. The first side wall surface includes at least two surface portions. The first surface portion is a curved surface having a recessed shape recessed toward a base end of the tool body, and the second surface portion is a curved surface having a recessed shape recessed toward the base end of the tool body, with a greater curvature radius than that of the first surface portion, or a flat surface. The two surface portions both come into contact with a cutting insert.

15 Claims, 20 Drawing Sheets

(52) U.S. Cl.
CPC ... *B23C 2200/0411* (2013.01); *B23C 2210/16* (2013.01); *B23C 2210/168* (2013.01)

(56) References Cited

U.S. PATENT DOCUMENTS

| | | | | |
|---|---|---|---|---|
| 4,600,341 | A * | 7/1986 | Board | B23B 27/1677 407/104 |
| 5,145,294 | A * | 9/1992 | Flueckiger | B23C 5/2221 407/113 |
| 6,004,081 | A | 12/1999 | Hellström et al. | |
| 6,048,140 | A | 4/2000 | Johnson | |
| 6,152,658 | A * | 11/2000 | Satran | B23B 27/00 407/103 |
| 6,164,878 | A | 12/2000 | Satran et al. | |
| 6,929,427 | B2 * | 8/2005 | Satran | B23C 5/109 407/113 |
| 7,179,021 | B2 * | 2/2007 | Shaheen | B23B 27/1644 407/101 |
| 7,255,518 | B2 * | 8/2007 | Wallstrom | B23B 27/1662 407/103 |
| 7,390,149 | B2 * | 6/2008 | Wihlborg | B23C 5/06 407/102 |
| 7,429,150 | B2 * | 9/2008 | Kovac | B23B 27/1662 407/103 |
| 7,546,786 | B2 * | 6/2009 | Waggle | B23B 27/22 407/115 |
| 7,819,610 | B2 * | 10/2010 | Wallstrom | B23C 5/2213 407/113 |
| 9,149,878 | B2 * | 10/2015 | Michelet | B23C 5/06 |
| 9,283,626 | B2 * | 3/2016 | Fang | B23C 5/2221 |
| 9,409,240 | B2 * | 8/2016 | Matsubara | B23C 5/2221 |
| 9,475,131 | B2 * | 10/2016 | Waggle | B23C 5/003 |
| 2006/0245837 | A1 * | 11/2006 | Dufour | B23C 5/06 409/132 |
| 2009/0311057 | A1 * | 12/2009 | Yoshida | B23C 5/109 407/113 |
| 2010/0080662 | A1 * | 4/2010 | Satran | B23C 5/2213 407/40 |
| 2011/0150586 | A1 * | 6/2011 | Fang | B23C 5/2208 407/69 |
| 2011/0293381 | A1 * | 12/2011 | Saji | B23C 5/109 407/40 |
| 2012/0009029 | A1 | 1/2012 | Saji | |
| 2013/0129436 | A1 | 5/2013 | Hoffer | |
| 2013/0330136 | A1 * | 12/2013 | Hecht | B23C 5/2221 407/113 |
| 2014/0212226 | A1 | 7/2014 | Saji et al. | |
| 2015/0298223 | A1 * | 10/2015 | Kumoi | B23C 5/109 407/102 |
| 2016/0023285 | A1 * | 1/2016 | Saji | B23C 5/207 407/33 |
| 2017/0050249 | A1 * | 2/2017 | Oikawa | B23C 5/10 |
| 2017/0326656 | A1 * | 11/2017 | Saji | B23C 5/109 |
| 2018/0036811 | A1 * | 2/2018 | Saji | B23C 5/109 |
| 2018/0169770 | A1 * | 6/2018 | Saji | B23B 51/00 |

FOREIGN PATENT DOCUMENTS

| | | |
|---|---|---|
| JP | 2005-040924 A | 2/2005 |
| WO | 2010/114094 A1 | 10/2010 |
| WO | 2013/051703 A1 | 3/2015 |

OTHER PUBLICATIONS

Written Opinion issued in PCT/JP2016/064619; dated Jul. 19, 2016.
International Preliminary Report on Patentability issued in PCT/JP2016/064619; dated Nov. 21, 2017.

* cited by examiner

TOOL BODY AND CUTTING TOOL

TECHNICAL FIELD

The present invention relates to a tool body on which a plurality of types of cutting inserts can be removably mounted, and a cutting tool having such cutting inserts mounted thereon.

BACKGROUND ART

Conventionally, the tool disclosed in Patent Document 1 has been used as an indexable rotary cutting tool for machining a three-dimensional shape of a die, etc. The cutting insert disclosed in Patent Document 1 has a cutting edge shape which allows for machining with a reduced amount of cutting depth and an increased feed speed, i.e., high-feed machining. Thus, this cutting insert is suited to roughing on a workpiece with high efficiency.

Meanwhile, an example of another indexable rotary cutting tool for machining a three-dimensional shape is disclosed in Patent Document 2. The cutting insert disclosed in Patent Document 2 has a substantially circular-arc shape in which, in a top view, a cutting edge thereof is projected outward. An indexable rotary cutting tool having a cutting insert which has the above edge shape mounted thereon is generally referred to as a radius cutter (or a radius end mill). In general, as to a radius cutter, a substantially circular-arc-shaped cutting edge thereof is capable of cutting, with high accuracy, a workpiece surface to be machined in three-dimensional machining, such as copy machining, and therefore, such radius cutter is suited not only to roughing but also to finishing.

CITATION LIST

Patent Documents

Patent Document 1: WO2010/114094
Patent Document 2: JP2005-040924 A

SUMMARY

Technical Problem

As to the cutting insert of Patent Document 1, an angle of depth is set so as to be extremely small and a major cutting edge is substantially linear in a top view, in order to achieve high-feed machining in an indexable rotary cutting tool, and therefore, such cutting insert is not suited to finishing. In other words, when performing three-dimensional machining, such as copy machining, with the use of the cutting insert of Patent Document 1, an amount of portions that remain uncut may be produced.

Meanwhile, the cutting insert of Patent Document 2 has a substantially circular-arc-shaped cutting edge for use in a radius cutter, and therefore, such cutting insert is suited to finishing. However, the cutting insert of Patent Document 2 is not suited to high-feed machining which is performed suitably in a cutting tool on which the cutting insert of Patent Document 1 is mounted.

In light of the above circumstances, the tools of both Patent Documents 1 and 2 are required to be used in three-dimensional machining, such as mold making, in order to successively perform roughing and finishing. At this time, the cutting insert of Patent Document 1 and the cutting insert of Patent Document 2 are, as a matter of course, respectively mounted on different types of tool bodies, and therefore, two types of tool bodies are required. This has led to the problem of an increased number of tool bodies needing to be used, resulting in a significant burden imposed on inventory control.

The present invention has been made in light of the above problem, and an object of the present invention is to provide a tool body on which a plurality of types of cutting inserts are capable of being removably mounted, and a cutting tool having such cutting inserts mounted thereon.

Solution to Problem

The present invention provides a tool body which has at least one insert seat and on which cutting inserts having different shapes are capable of being mounted, wherein: the insert seat comprises a bottom wall surface and a side wall surface and has a configuration in which the bottom wall surface or a surface formed by extending the bottom wall surface and the side wall surface or a surface formed by extending the side wall surface intersect with each other; the side wall surface comprises at least two surface portions which are capable of coming into contact with a peripheral side surface of the cutting insert; and from among the two surface portions, the first surface portion is a curved surface in a recessed shape, and the second surface portion is a curved surface in a recessed shape having a greater curvature radius than that of the first surface portion or a flat surface.

The present invention further provides a cutting tool comprising the above-described tool body and a cutting insert removably mounted on the insert seat, wherein: the cutting insert has a first end surface, a second end surface which is arranged so as to oppose the first end surface, and a peripheral side surface which extends between the first and second end surfaces; an intersecting edge between the first end surface and the peripheral side surface is provided with a cutting edge; and a portion of the peripheral side surface comes into contact with the second surface portion of the first wall surface of the insert seat.

The present invention further provides a cutting tool comprising the above-described tool body and a cutting insert removably mounted on the insert seat, wherein: the cutting insert has a first end surface, a second end surface which is arranged so as to oppose the first end surface, and a peripheral side surface which extends between the first and second end surfaces; an intersecting edge between the first end surface and the peripheral side surface is provided with a cutting edge; and a portion of the peripheral side surface comes into contact with the first surface portion of the first wall surface of the insert seat.

Advantageous Effects of Invention

The present invention can provide a tool body on which a plurality of types of cutting inserts are capable of being removably mounted, and a cutting tool having such cutting inserts mounted thereon.

DESCRIPTION OF EMBODIMENTS

Figure 1:
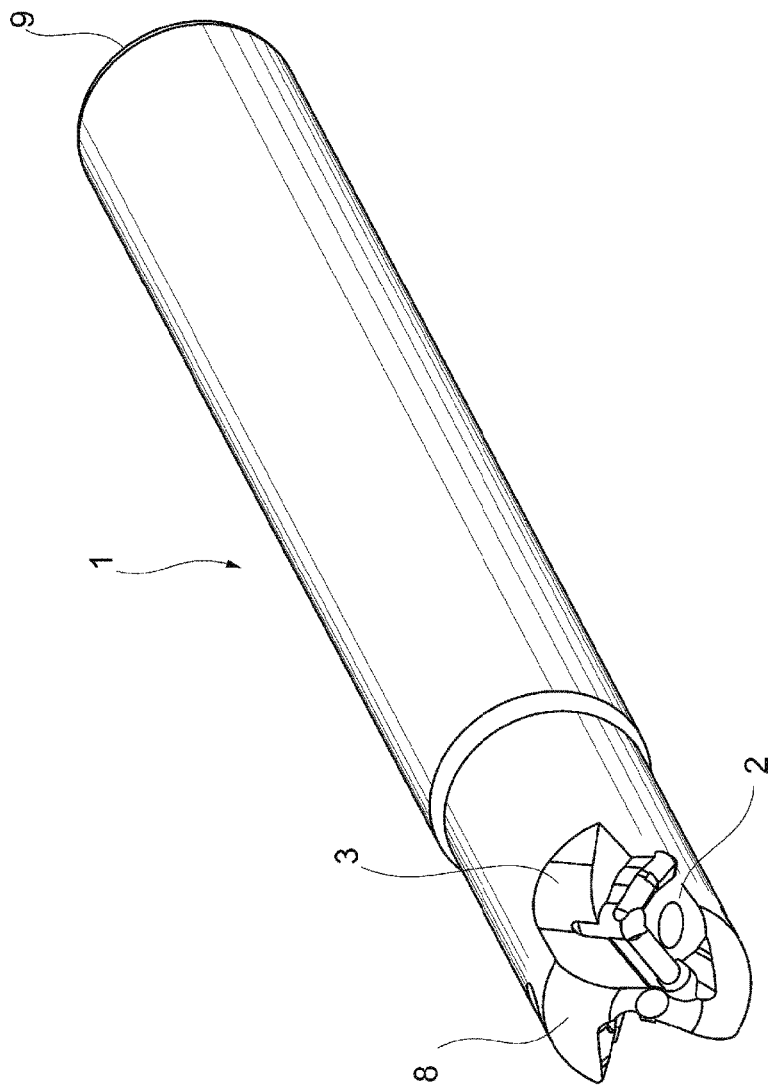
FIG. 1 is a perspective view of an embodiment of a tool body according to the present invention.
Figure 2:
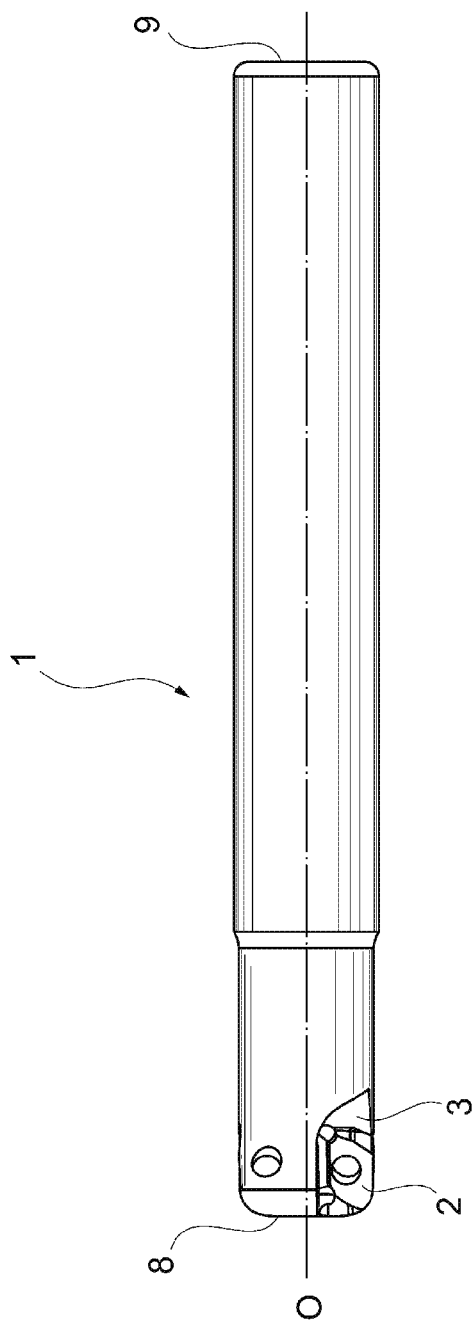
FIG. 2 is a side view of the embodiment of the tool body according to the present invention.
Figure 3:
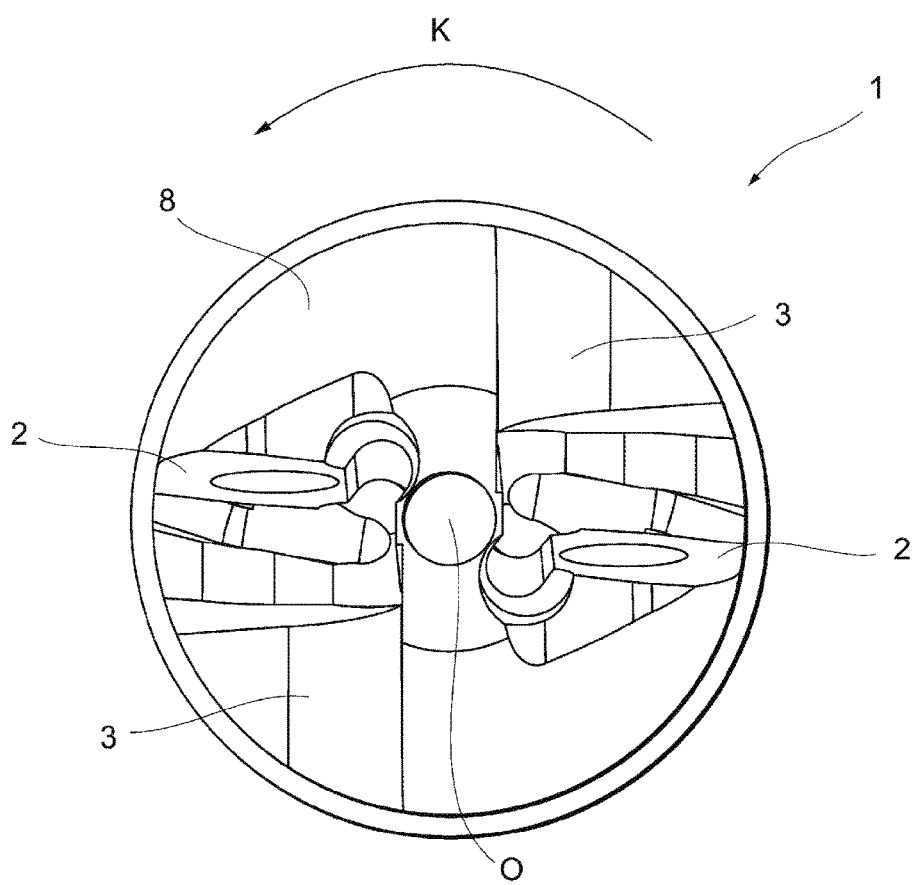
FIG. 3 is a leading end surface view of the embodiment of the tool body according to the present invention.
Figure 4:
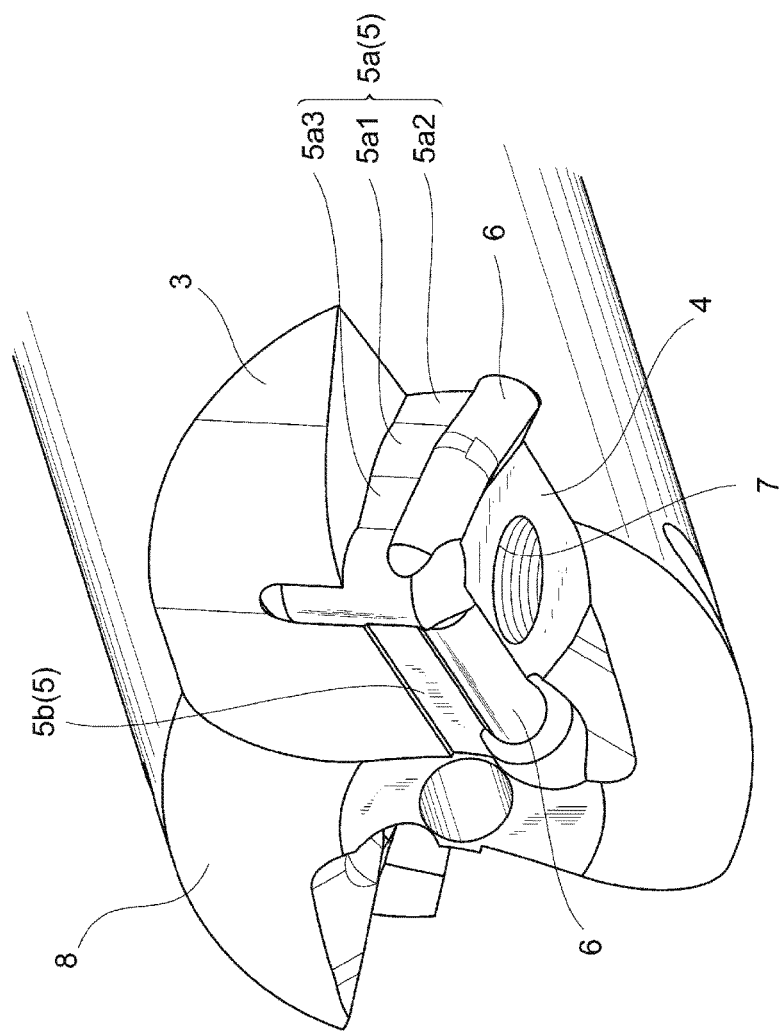
FIG. 4 is an enlarged perspective view of an insert seat and its peripheral part in the tool body shown in FIGS. 1 to 3.

Embodiment of the present invention will now be described in detail with reference to the attached drawings.

A tool body 1 according to the present embodiment has, as its entire shape, a substantially cylindrical shape which has a rotational axis O defined so as to pass through the tool body 1 from a leading end 8 to a base end 9 thereof, as shown in FIGS. 1 to 5. Around the leading end 8 of the tool body 1, two insert seats 2 are arranged at regular intervals in a circumferential direction around the rotational axis O. However, in the present invention, the configuration is not limited thereto. The number of insert seats 2 may be one or three or more. Further, the plurality of insert seats 2 may be arranged at irregular intervals in the circumferential direction. These insert seats 2 are opened toward the leading end 8 of the tool body 1 and toward the outer periphery thereof, and such insert seats 2 have the same shape. Further, a chip pocket 3 is formed so as to be adjacent to each insert seat 2.

Each insert seat 2 has a bottom wall surface 4 and a side wall surface 5. The bottom wall surface 4 is a surface formed so as to face forward in a tool rotating direction K around the rotational axis O. Meanwhile, the side wall surface 5 is a surface formed so as to intersect with the bottom wall surface 4 at a desired angle. The bottom wall surface 4 and the side wall surface 5 are not connected with each other, and recessed part 6 is formed therebetween. Therefore, in practice, a surface formed by extending the bottom wall surface 4 and a surface formed by extending the side wall surface 5 intersect with each other. Further, the side wall surface 5 is constituted by a first side wall surface 5a facing toward the leading end 8 of the tool body 1 and a second side wall surface 5b facing toward the outer periphery of the tool body 1. The first side wall surface 5a and the second side wall surface 5b are not connected to each other and are arranged so as to be apart from each other. Further, the bottom wall surface 4 is provided with a threaded hole 7.

The bottom wall surface 4 is comprised of a single plane and has a shape and size which match the shape of a cutting insert to be mounted. The second side wall surface 5b is comprised of a single flat surface and has a substantially long rectangular shape in a direction in which the central axis O extends. Meanwhile, the first side wall surface 5a is constituted by a combination of a plurality of types of surfaces. More specifically, the first side wall surface 5a is constituted by a first surface portion 5a1, a second surface portion 5a2 and a third surface portion 5a3. In the present embodiment, the third surface portion 5a3, the first surface portion 5a1 and the second surface portion 5a2 are placed in this order from the central axis O toward the outer periphery of the tool. The third surface portion 5a3 is located closest to the central axis O and is comprised of a single flat surface. The first surface portion 5a1 is connected to the third surface portion 5a3, and, as opposed to the third surface portion 5a3, the first surface portion 5a1 is comprised of a curved surface which is curved, in a recessed shape, toward the base end 9 of the tool body 1. The second surface portion 5a2 is comprised of a single flat surface connected, on the opposite side to a side to which the third surface portion 5a3 is connected, to the first surface portion 5a1. Therefore, the second surface portion 5a2 is located closest to the outer periphery. Further, in the present embodiment, the first surface portion 5a1 is arranged at a position encompassing substantially a center area of the first side wall surface 5a as the insert seat 2 is viewed from a direction facing the bottom wall surface 4. The term "substantially a center" herein refers to an area near a center of the first side wall surface 5a in a direction substantially perpendicularly intersecting with the central axis O.

Figure 5:
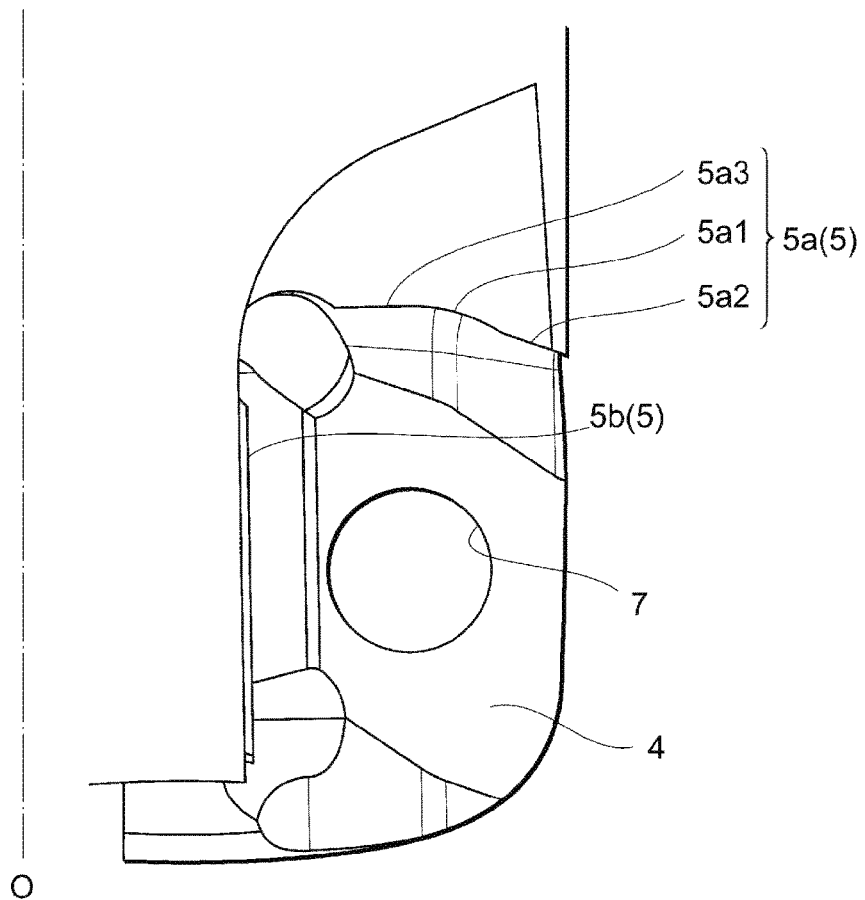
FIG. 5 is an enlarged side view of an insert seat and its peripheral part in the tool body shown in FIGS. 1 to 3, the view seen from a direction perpendicularly facing a bottom surface of the insert seat.

As shown in FIG. 5, as viewed from a direction perpendicularly facing the bottom wall surface 4, the second side wall surface 5b has a positional relationship so as to be substantially parallel to the central axis O. Meanwhile, in the first side wall surface 5a, the third surface portion 5a3 has a positional relationship so as to be substantially perpendicular to the central axis O. Further, the second surface portion 5a2 is inclined relative to the central axis O such that a portion thereof closer to the outer periphery of the tool is closer to the leading end 8 of the tool. The first surface portion 5a1 is arranged so as to be inclined in its entirety such that a portion thereof connected to the second surface portion 5a2 is closer to the leading end 8 of the tool body 1 than a portion thereof connected to the third surface portion 5a3.

Next, two types of cutting inserts 11, 21 which are mounted on the tool body 1 will be described.

Figure 6:
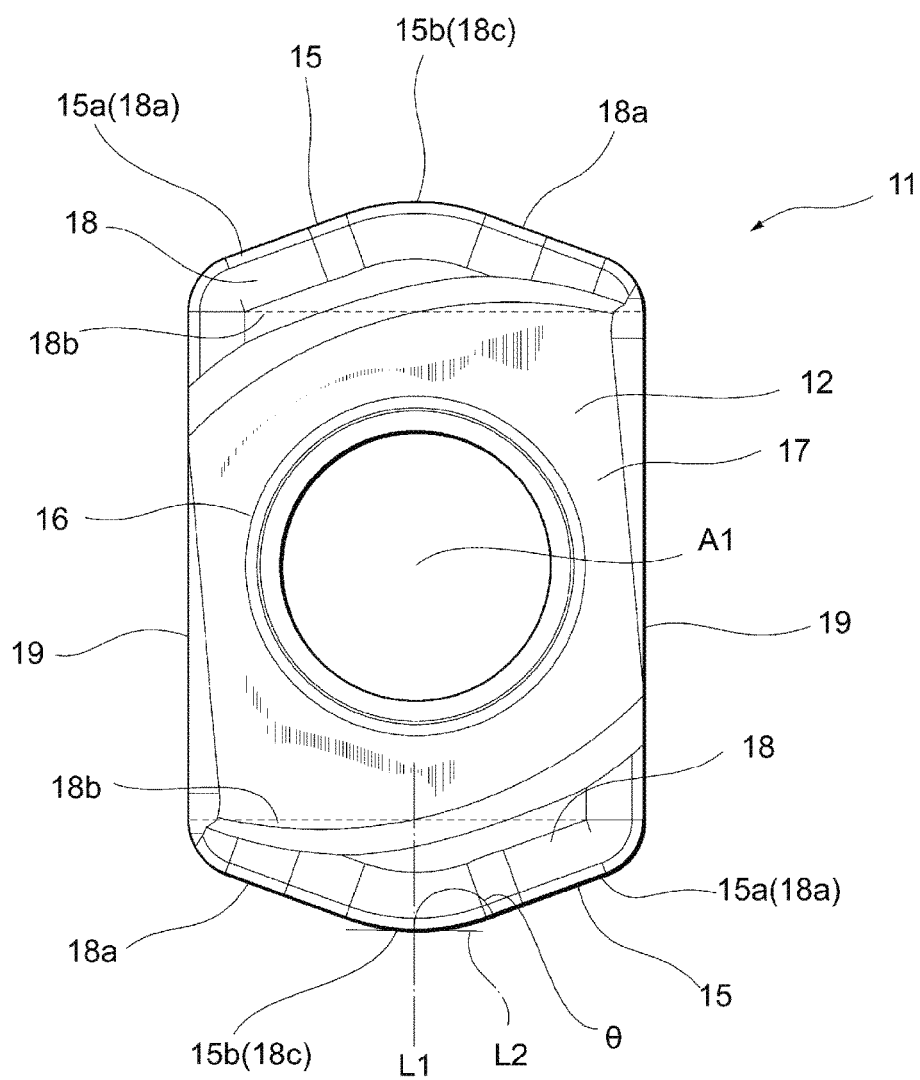
FIG. 6 is a front view of a first cutting insert.
Figure 7:
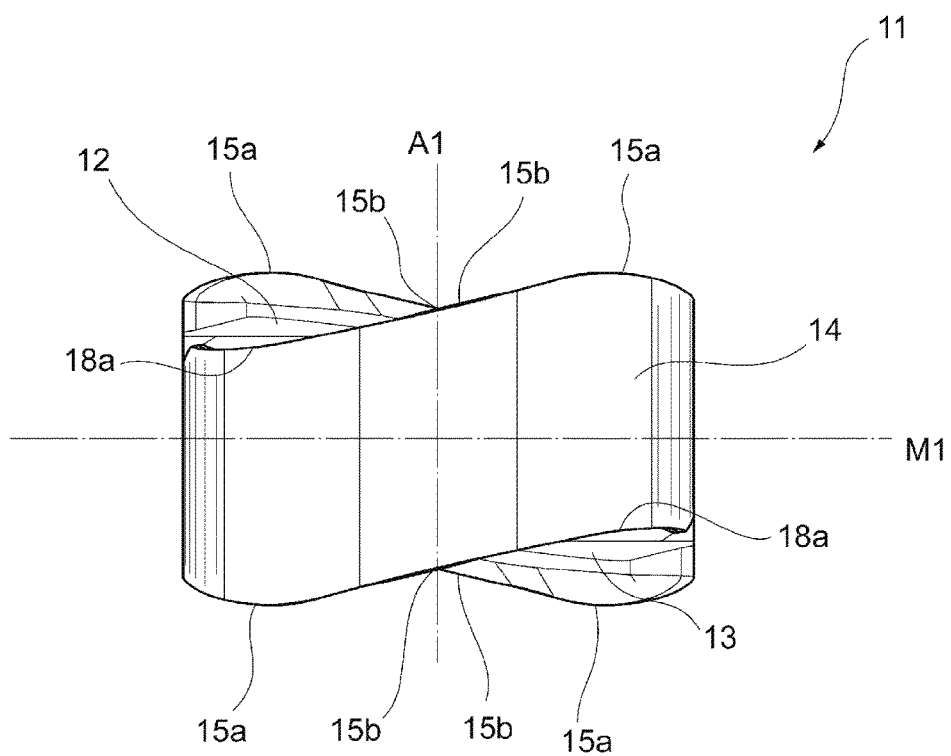
FIG. 7 is a side view of the first cutting insert, the view seen from the direction of a shorter-side side surface.
Figure 8:
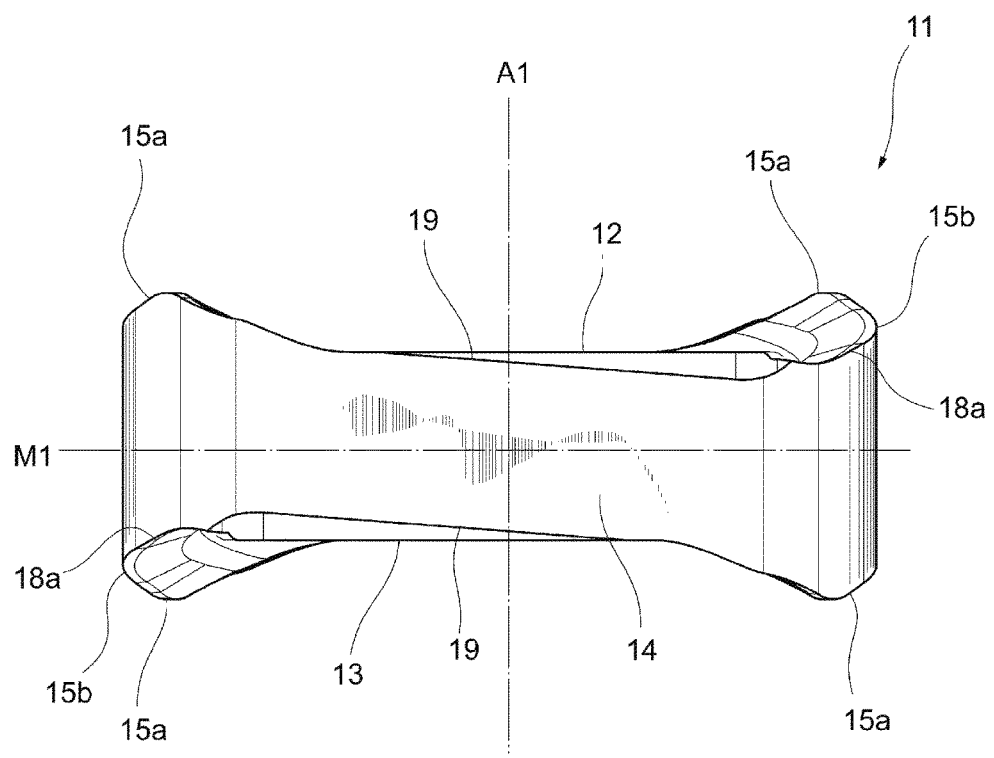
FIG. 8 is a side view of the first cutting insert, the view seen from the direction of a longer-side side surface.

As shown in FIGS. 6 to 8, the first cutting insert 11 comprises a first end surface 12 and a second end surface 13 which are substantially opposed to each other, i.e., which are arranged on substantially opposite sides from each other, and a peripheral side surface 14 which extends therebetween. The first end surface 12 and the second end surface 13 each have a substantially hexagonal shape in the plan view of FIG. 6. To be more specific, such substantially hexagonal shape is a shape which is constituted by a substantially quadrangular portion indicated by the broken line in FIG. 6 and two substantially triangular portions 18 which are respectively joined to two opposing short sides of the substantially quadrangular portion 17. Each substantially triangular portion 18 has an isosceles triangular shape which is, in general, constituted by two linear oblique sides 18a and one linear base 18b. This base 18b corresponds to a short side of the substantially quadrangular portion 17. Therefore, the above-described substantially hexagonal shape can also be referred to as a shape in which the two substantially triangular portions 18 which do not share their bottoms 18b are connected with two substantially linear portions 19 (corresponding to long sides of the substantially quadrangular portion 17). Further, a connecting part 18c between the two oblique sides 18a of the substantially triangular portion 18 has a circular arc shape. The two substantially triangular portions 18 have the same shape.

In the present embodiment, the outer-shape portions which connect the two substantially triangular portions 18 are the substantially linear portions 19. However, the outer-shape portions are each not to be limited to having such shape. The outer portions may each be shaped so as to be projected outward of the cutting insert or shaped so as to be recessed inward of the cutting insert in a plan view, i.e., a top view.

Herein, a reference axis A1 is defined which penetrates substantially respective centers of the first end surface 12 and the second end surface 13 and which extend substantially perpendicularly to such end surfaces. The cutting insert 11 is formed so as to have a shape of 180-degree rotational symmetry, i.e., a shape of 2-fold rotational symmetry, about the reference axis A1. Further, a mounting hole 16 is formed so as to penetrate the two end surfaces 12, 13, and the mounting hole 16 is arranged such that a central axis thereof matches the reference axis A1 of the cutting insert 11. The reference axis A1 extends perpendicularly to the first end surface 12. The first end surface 12 and the second end surface 13 are arranged so as to be substantially parallel to each other. The cutting insert 11 is formed so as to have the same shape when it is rotated by 180 degrees around an axis orthogonal to the reference axis A such that the two end surfaces 12, 13 are reversed. Further, the peripheral side surface 14 intersects substantially perpendicularly with the two end surfaces 12, 13. Accordingly, the cutting insert 11 of the present embodiment is of a so-called negative type with a clearance angle of 0 degrees.

In the cutting insert 11 of the present embodiment, an intersecting edge between the peripheral side surface 14 and each of the first end surface 12 and the second end surface 13 is provided with cutting edges 15 along such intersecting edge. In other words, the cutting insert 11 of the present embodiment is of a double-sided use type in which both the first and second end surfaces 12, 13 can be used for cutting. When the cutting edges 15 of the first end surface 12 are used for cutting, the first end surface 12 serves as a rake surface, the second end surface 13 serves as a seating surface, and the peripheral side surface 14 serves as a flank or a contact surface. Meanwhile, when the cutting edges 15 of the second end surface 13 are used for cutting, the second end surface 13 serves as a rake surface, the first end surface 12 serves as a seating surface, and the peripheral side surface 14 serves as a flank or a contact surface. The seating surface and the contact surface each refer to a surface having a portion which comes into contact with the insert seat 2 of the tool body 1. Each cutting edge 15 is associated with one of the substantially triangular portions 18 of the corresponding end surface. Each end surface has the two substantially triangular portions 18 and is thus provided with two cutting edges 15. Such two cutting edges 15 are arranged so as to be of 180-degree rotational symmetry about the reference axis A1.

As a result, since, as described above, the two end surfaces 12, 13 are formed so that the same shape is generated when the cutting insert 11 is rotated by 180 degrees around the axis orthogonal to the reference axis A, the cutting insert 11 of the present embodiment will be described in terms of the first end surface 12 only. Each cutting edge 15 is, in general, constituted by two portions 15a, 15b. As to each cutting edge 15, in the plan view of FIG. 6, a portion thereof corresponding to one of the oblique sides 18a of the substantially triangular portion 18 is referred to as the linear cutting edge 15a, and the connecting part 18c where the two oblique sides 18a of the substantially triangular portion 18 intersect with each other is referred to as the curved cutting edge 15b. The linear cutting edge 15a is configured so as to function as a major cutting edge which cuts a side wall surface serving as a workpiece surface to be machined. Meanwhile, the curved cutting edge 15b is configured so as to function as a minor cutting edge which cuts a bottom wall surface serving as a workpiece surface to be machined. In the cutting insert 11 of the present embodiment, as shown in FIG. 6, an interior angle θ (i.e., a corner angle) which is formed by a tangent L2 of the minor cutting edge 15b on a bisector L1 of an interior angle of the minor cutting edge 15b and the major cutting edge 15a is 70 degrees. Therefore, when mounting the cutting insert 11 on the tool body, an angle formed by the major cutting edge 15a and a surface of a workpiece (a cutting edge angle (≈90°−θ)) can be made small, and thus, the cutting insert 11 can be used suitably in high-feed machining. In order to suitably carry out high-feed machining, the corner angle θ is preferably from 60 degrees to 80 degrees. Further, each dimension of the cutting edge 15 is adjusted as appropriate in accordance with, for example, the shape of a workpiece.

Herein, a virtual plane which is orthogonal to the reference axis A1 and which passes through the peripheral side surface 14 is defined as an intermediate plane M1. The intermediate plane M1 substantially divides the cutting insert 11 into halves. As is apparent from the side views of FIGS. 7 and 8, the linear cutting edge 15a extends, in general, so as to become more distant from the intermediate plane M1 as it heads away from the curved cutting edge 15b. The linear cutting edge 15a has a portion thereof most distant from the intermediate plane M1, in the vicinity of a portion thereof which intersects with the substantially linear portion 19. Further, the curved cutting edge 15b extends so as to approach the intermediate plane M1 as it heads away from the linear cutting edge 15a. It should be noted that the other oblique side 18a, which is not the oblique side 18a serving as the linear cutting edge 15a, extends so as to approach the intermediate plane M1 as it heads away from the adjacent curved cutting edge 15b.

The cutting insert 11 is provided with two sets of cutting edges, i.e., the two cutting edges 15, on the first end surface 12 side. Therefore, when regarding one major cutting edge 15a and one minor cutting edge 15b as constituting one cutting edge section, the first and second end surfaces 12, 13 are each provided with two such cutting edge sections. In the cutting insert 11 of the present embodiment, the intersecting edge between the second end surface 13 and the peripheral side surface 14 is also provided with the cutting edges 15, as with the case of the first end surface 12. Each of the cutting edges 15 is formed so that the same shape is generated when the cutting insert 11 is rotated by 180 degrees around the axis orthogonal to the reference axis A1 such that the first end surface 12 and the second end surface 13 are reversed. In other words, a total of four sets of cutting edges 15 are formed. Accordingly, the cutting insert 11 is an economical insert since it can be used at least four times—twice by using the first end surface 12 side and twice by using the second end surface 13 side.

Figure 9:
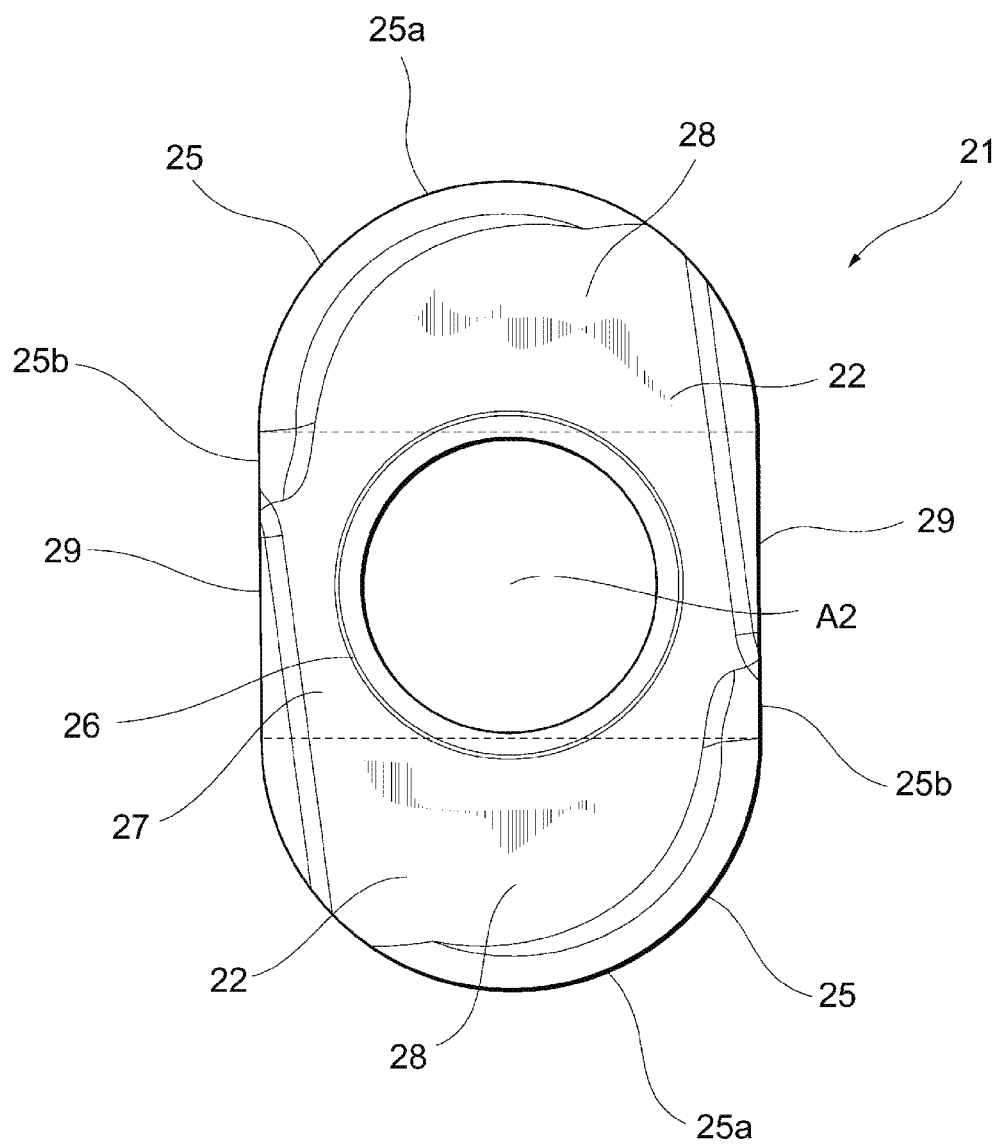
FIG. 9 is a front view of a second cutting insert.
Figure 10:
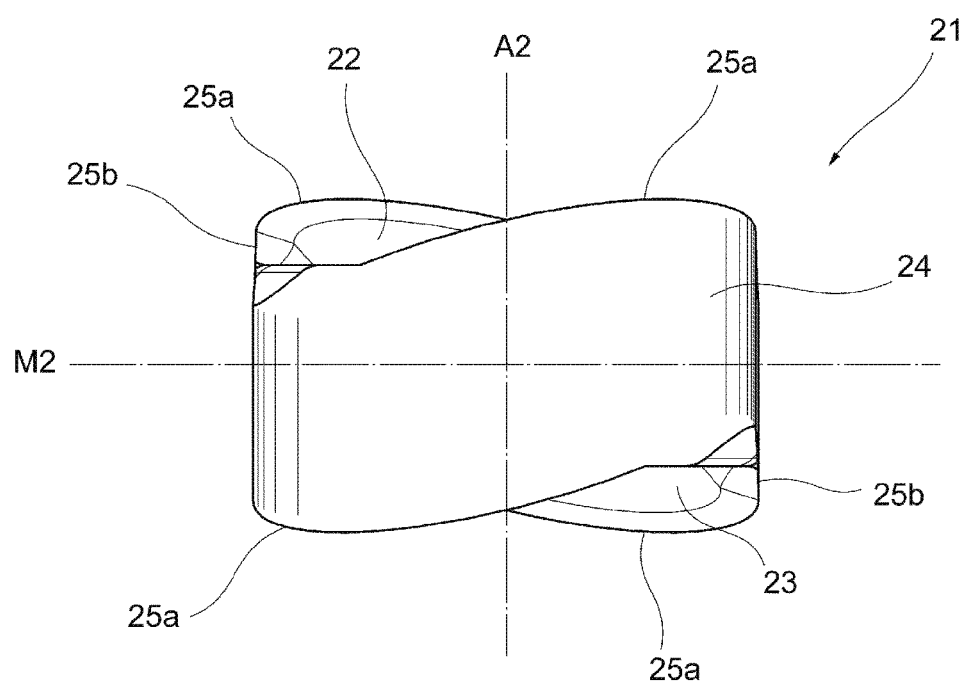
FIG. 10 is a side view of the second cutting insert, the view seen from the direction of a shorter-side side surface.
Figure 11:
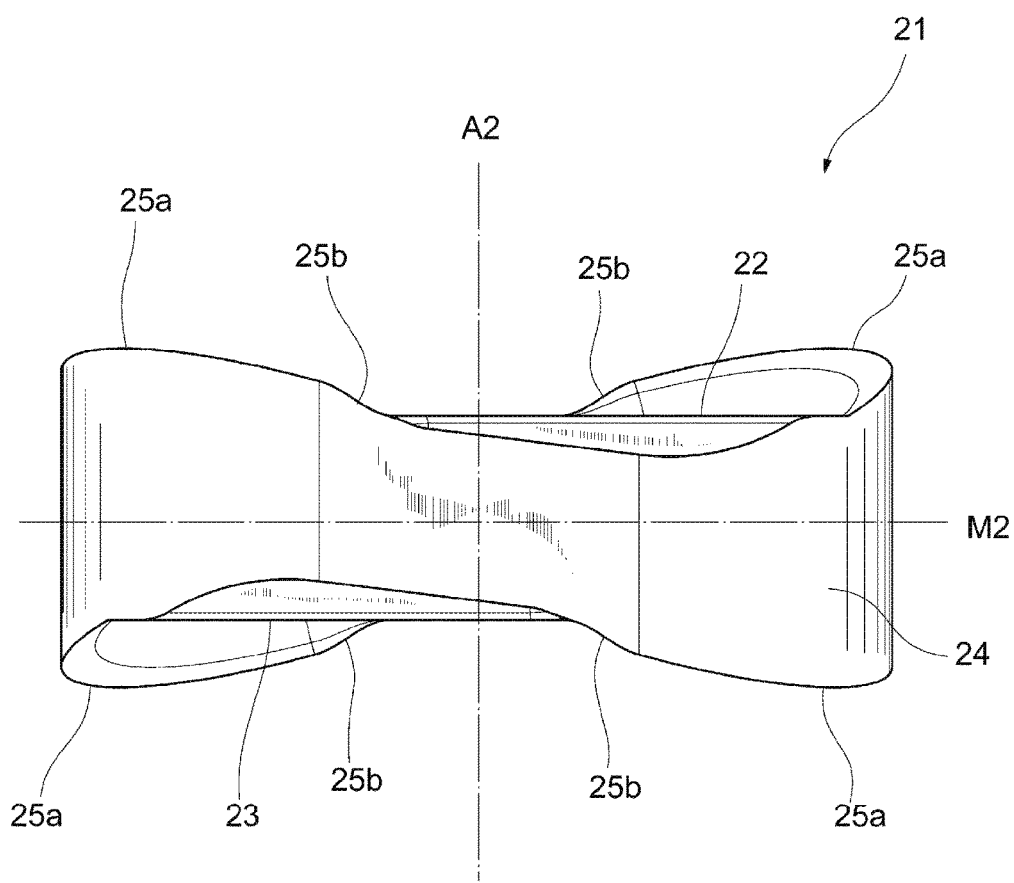
FIG. 11 is a side view of the second cutting insert, the view seen from the direction of a longer-side side surface.

As shown in FIGS. 9 to 11, the second cutting insert 21 comprises a first end surface 22 and a second end surface 23 which are substantially opposed to each other, i.e., which are arranged on substantially opposite sides from each other, and a peripheral side surface 24 which extends therebetween. The first end surface 22 and the second end surface 23 each have a substantially rounded quadrangular shape in the plan view of FIG. 9. Such substantially rounded quadrangular shape is a shape which is constituted by a substantially quadrangular portion 27 indicated by the broken line in FIG. 9 and two substantially semicircular portions 28 which are respectively joined to two opposing sides of the substantially rounded quadrangular portion 27. That is, the substantially rounded quadrangular shape is a shape in which the two substantially semicircular portions 28 which do not share their centers are connected with two substantially linear portions 29. Each substantially semicircular portion 28 is smoothly tangential to the substantially linear portions 29. Further, the two substantially semicircular portions 28 have the same shape.

In the present embodiment, the outer-shape portions which connect the two substantially semicircular portions 28 are the substantially linear portions 29. However, the outer-shape portions are each not to be limited to having such shape. The outer portions may each be shaped so as to be projected outward of the cutting insert or shaped so as to be recessed inward of the cutting insert in a plan view, i.e., a top view.

Herein, a reference axis A2 which penetrates substantially respective centers of the first end surface 22 and the second end surface 23 and which extend substantially perpendicularly to such end surfaces is defined. The cutting insert 21 is formed so as to have a shape of 180-degree rotational symmetry, i.e., a shape of 2-fold rotational symmetry, about the reference axis A2. In other words, in the plan view of FIG. 9, centers of the respective circular arcs of the two substantially semicircular portions 28 are apart in the opposite directions by the same distance from the reference axis A2. Further, in FIG. 9, the curvature radii of the circular arcs of the two substantially semicircular portions 28 are equal to each other. A mounting hole 26 is formed so as to penetrate the two end surfaces 22, 23, and the mounting hole 26 is arranged such that a central axis thereof matches the reference axis A2 of the cutting insert 21. The reference axis A2 extends perpendicularly to the first end surface 22. The first end surface 22 and the second end surface 23 are arranged so as to be substantially parallel to each other. The cutting insert 21 is formed so as to have the same shape when it is rotated by 180 degrees around an axis orthogonal to the reference axis A2 such that the two end surfaces 22, 23 are reversed. Further, the peripheral side surface 24 intersects substantially perpendicularly with the two end surfaces 22, 23. Accordingly, the cutting insert 21 of the present embodiment is of a so-called negative type with a clearance angle of 0 degrees.

In the cutting insert 21 of the present embodiment, an intersecting edge between the peripheral side surface 24 and each of the first end surface 22 and the second end surface 23 is provided with cutting edges 25 along such intersecting edge. In other words, the cutting insert 21 of the present embodiment is of a double-sided use type in which both the first and second end surfaces 22, 23 can be used for cutting. When the cutting edges 25 of the first end surface 22 are used for cutting, the first end surface 22 serves as a rake surface, the second end surface 23 serves as a seating surface, and the peripheral side surface 24 serves as a flank or a contact surface. Meanwhile, when the cutting edges 25 of the second end surface 23 are used for cutting, the second end surface 23 serves as a rake surface, the first end surface 22 serves as a seating surface, and the peripheral side surface 24 serves as a flank or a contact surface. The seating surface and the contact surface each refer to a surface having a portion which comes into contact with the insert seat 2 of the tool body 1.

The cutting insert 21 of the present embodiment will be described below in terms of the first end surface 22 only. Each cutting edge 25 is, in general, constituted by two portions 25a, 25b. As described above, a contour shape of the first end surface 22 includes the substantially semicircular portions 28 and the substantially linear portions 29. As to each cutting edge 25, in a plan view, a portion of the cutting edge 25 which corresponds to the substantially semicircular portion 28 is referred to as the circular-arc-shaped cutting edge 25a, and a portion of the cutting edge 25 which corresponds to the substantially linear portion 29 is referred to as the linear cutting edge 25b. In the plan view, the circular-arc-shaped cutting edge 25a is formed such that, in a plan view, the length thereof along the circular-arc-shaped cutting edge 25a is longer than the length of the linear cutting edge 25b. In other words, the cutting edge 25 is configured such that it is mainly the circular-arc-shaped cutting edge 25a that functions. In the cutting insert 21 of the present embodiment, a curvature radius R of the arc of the circular-arc-shaped cutting edge 25a is approximately 4 mm in a plan view. However, the configuration is not limited thereto. Each dimension of the cutting edge 25 is adjusted as appropriate in accordance with, for example, the shape of a workpiece. Further, the cutting edge 25 may be formed throughout the intersecting edge of the first end surface 22 and the peripheral side surface 24 or may be formed through only part of such intersecting edge.

Herein, a virtual plane which is orthogonal to the reference axis A2 and which passes through the peripheral side surface 24 is defined as an intermediate plane M2. The intermediate plane M2 substantially divides the cutting insert 21 into halves. As is apparent from the side views of FIGS. 10 and 11, each curved cutting edge 25a extends, in general, so as to become more distant from the intermediate plane M2 as it heads away from the linear cutting edge 25b. The curved cutting edge 25a has, at a position in the vicinity of a center thereof, a portion most distant from the intermediate plane M2. Further, the curved cutting edge 25a extends so as to approach the intermediate plane M2 as it heads away from the linear cutting edge 25b.

The cutting insert 21 is provided with two sets of cutting edges, i.e., the two cutting edges 25, on the first end surface 22 side. Therefore, when regarding one circular-arc-shaped cutting edge 25a and one linear cutting edge 25b as constituting one cutting edge section, the upper and lower surfaces are each provided with two such cutting edge sections. In the cutting insert 21 of the present embodiment, the intersecting edge between the second end surface 23 and the peripheral side surface 24 is also provided with the cutting edges 25, as with the case of the first end surface 22. Each of the cutting edges 25 is formed so that the same shape is generated when the cutting insert 21 is rotated by 180 degrees around the axis orthogonal to the reference axis A2 such that the first end surface 22 and the second end surface 23 are reversed. In other words, a total of four sets of cutting edges 25 are formed. Accordingly, the cutting insert 21 is an economical insert since it can be used at least four times—twice by using the first end surface 22 side and twice by using the second end surface 23 side.

The cutting inserts 11, 21 can each be made of hard materials, such as cemented carbide, cermet, ceramic, or an ultrahigh-pressure sintered body containing diamond or cubic boron nitride, or a material obtained by applying PVD or CVD coating to these materials.

Next, an indexable rotary cutting tool 31 will be described in which the first cutting insert 11 or the second cutting insert 22 is mounted on the tool body 1.

Figure 12:
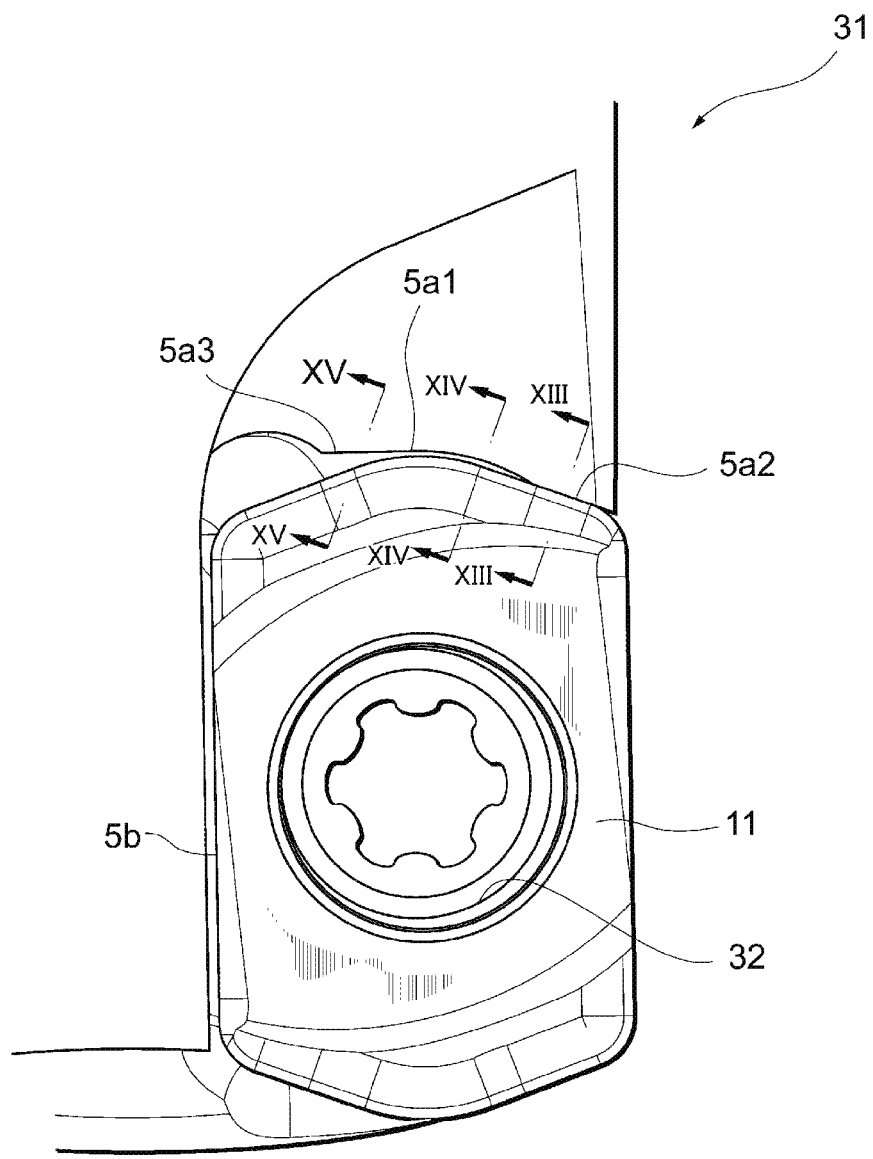
FIG. 12 is an enlarged side view of an insert seat and its peripheral part in an indexable cutting tool on which the first cutting insert is mounted, the view seen from a direction vertical to a bottom surface of the insert seat.

As shown in FIG. 12, the first cutting insert 11 is removably mounted on the insert seat 2 of the tool body 1 by means of a clamping member 32 which is a mechanical mounting means. The indexable rotary cutting tool 31 of this embodiment employs a fastening screw as the clamping member 32. However, the clamping member 32 is not limited thereto. The cutting insert 11 is mounted on each of the insert seats 2 of the tool body 1.

Figure 13:
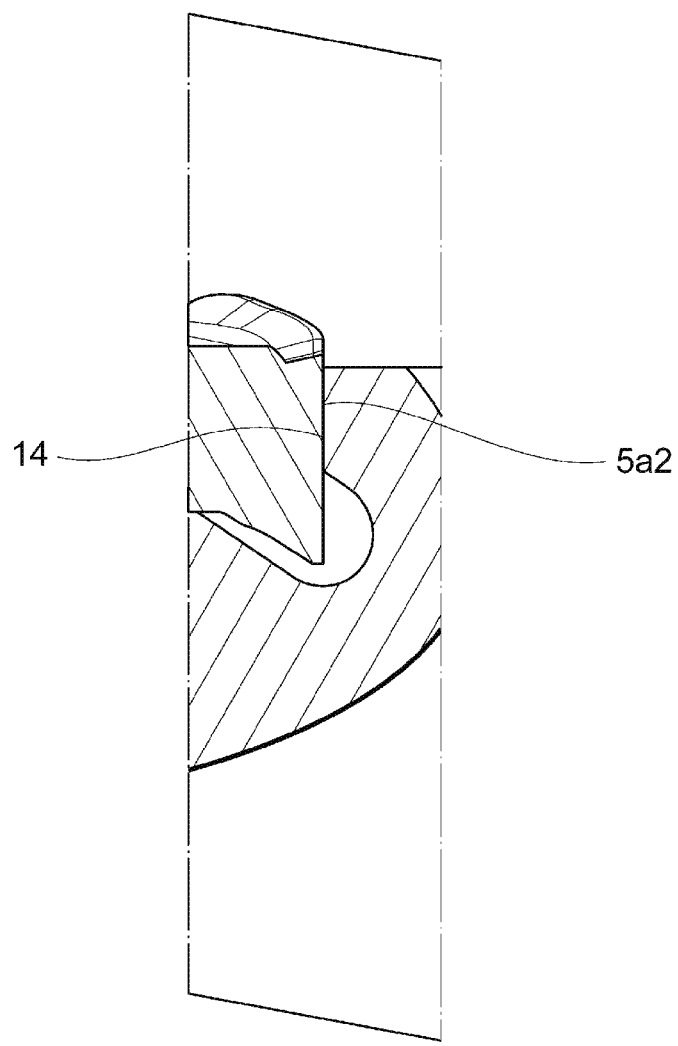
FIG. 13 is a cross-sectional view taken along XIII-XIII of FIG. 12.
Figure 14:
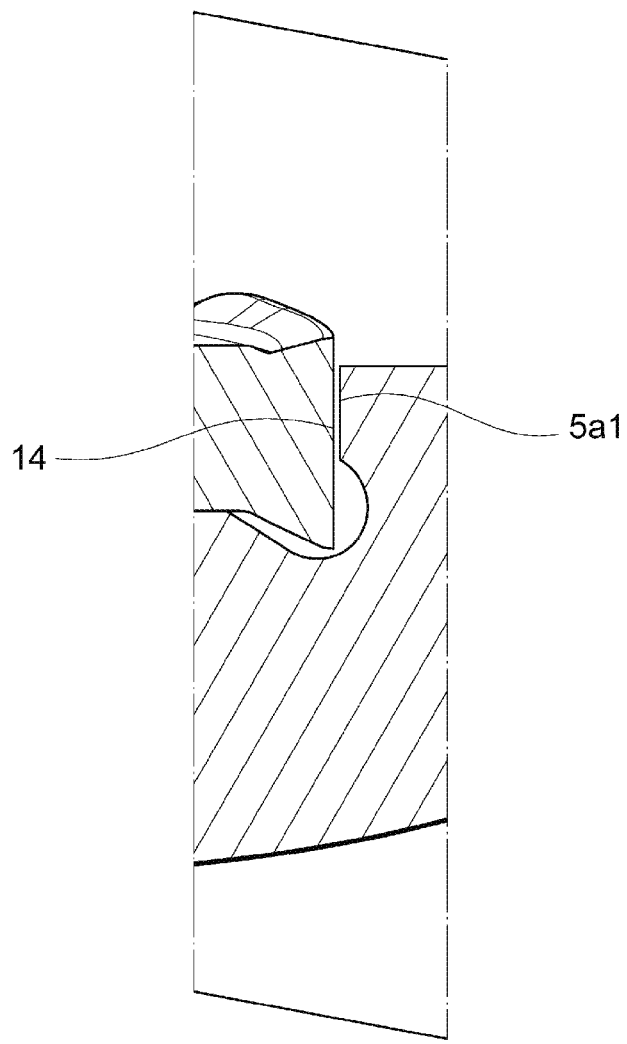
FIG. 14 is a cross-sectional view taken along XIV-XIV of FIG. 12.
Figure 15:
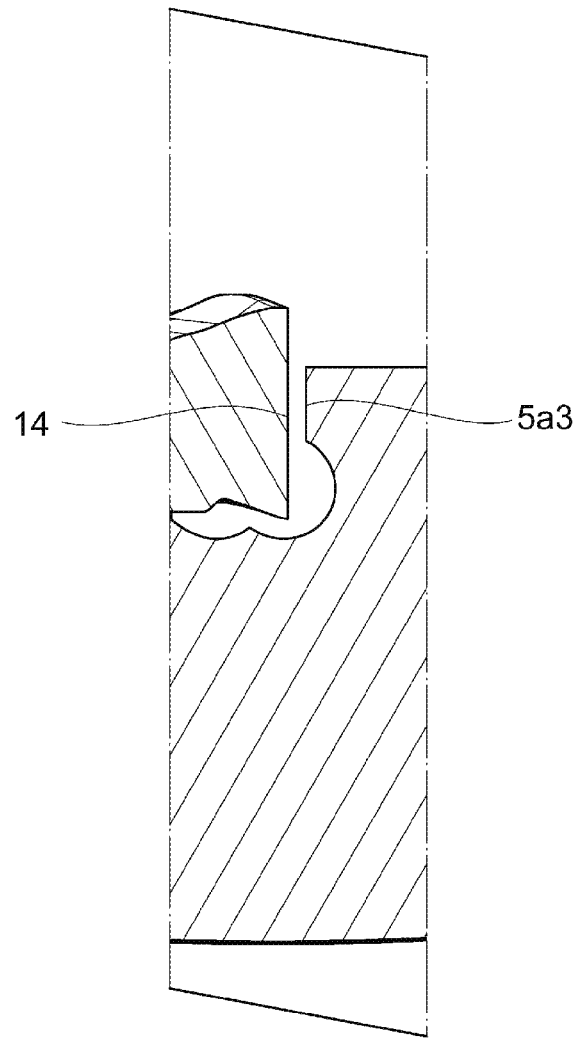
FIG. 15 is a cross-sectional view taken along XV-XV of FIG. 12.

When the cutting insert 11 is mounted such that one of the cutting edges 15 formed in the first end surface 12 is involved in cutting, the second end surface 13 of the cutting insert 11 comes into contact with the bottom wall surface 4 of the insert seat 2, and the peripheral side surface 14 of the cutting insert 11 comes into contact with the side wall surface 5 of the insert seat 2. As to the contact between the peripheral side surface 14 and the side wall surface 5, to be more specific, the peripheral side surface 14 comes into contact with the second side wall surface 5b in its entirety. Meanwhile, with regard to the first side wall surface 5a, as shown in FIGS. 13 to 15, the peripheral side surface 14 comes into contact with the second surface portion 5a2 only. In other words, the peripheral side surface 14 does not come into contact with the first surface portion 5a1 and the third surface portion 5a3 of the first side wall surface 5a.

Figure 16:
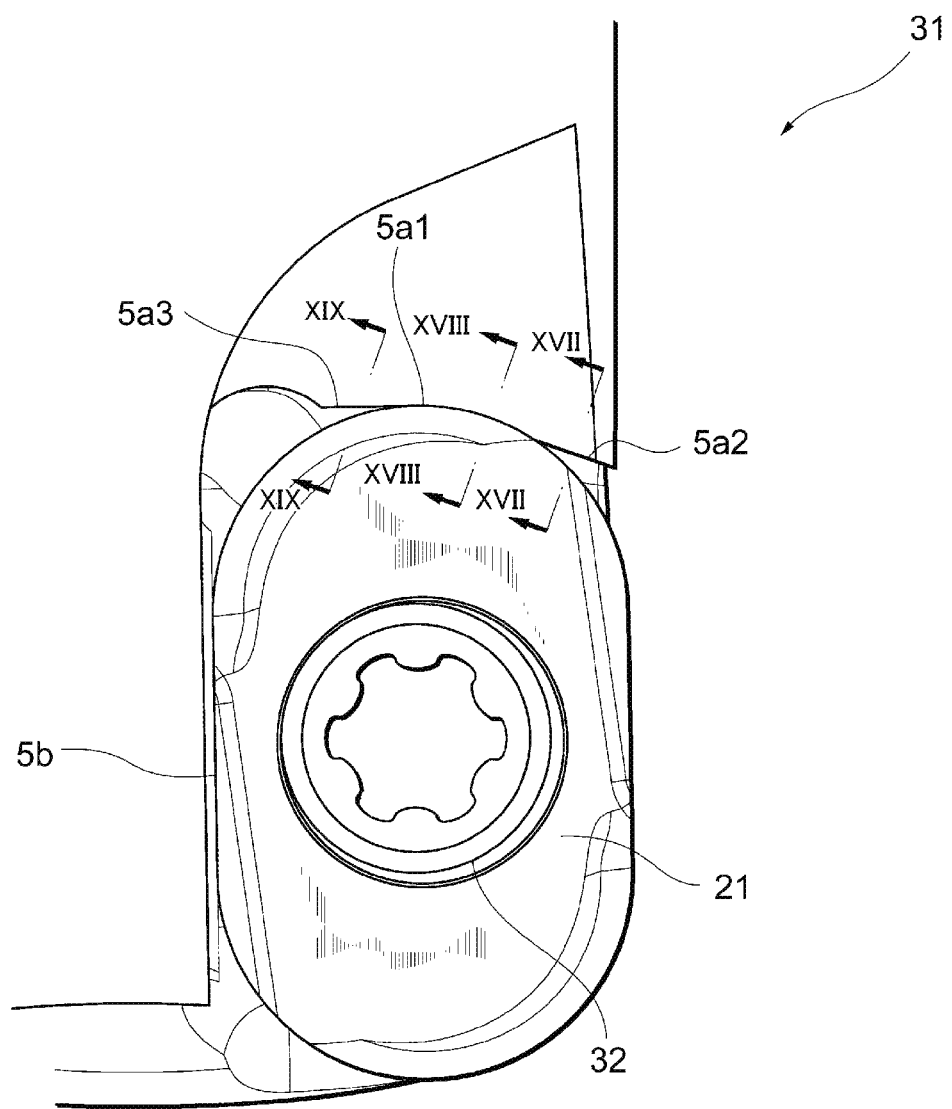
FIG. 16 is an enlarged side view of an insert seat and its peripheral part in an indexable cutting tool on which the second cutting insert is mounted, the view seen from a direction vertical to a bottom surface of the insert seat.

As shown in FIG. 16, the second cutting insert 21 is removably mounted on the insert seat 2 of the tool body 1 by means of the clamping member 32 which is a mechanical mounting means (being the same as that used when mounting the first cutting insert 11). The cutting insert 21 is mounted on each of the insert seats 2 of the tool body 1. This tool body 1 is the same as the tool body 1 on which the first cutting insert 11 has been mounted.

Figure 17:
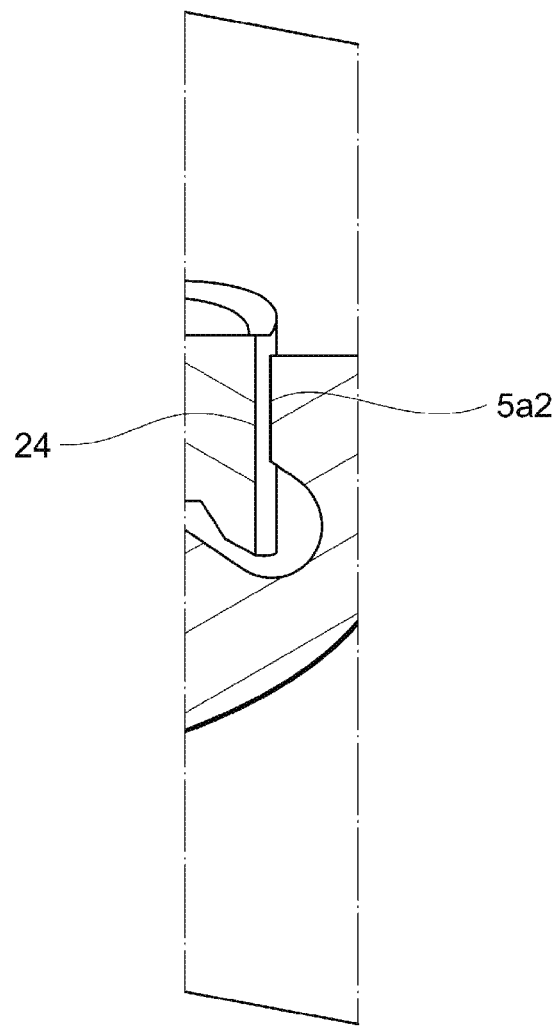
FIG. 17 is a cross-sectional view taken along XVII-XVII of FIG. 16.
Figure 18:
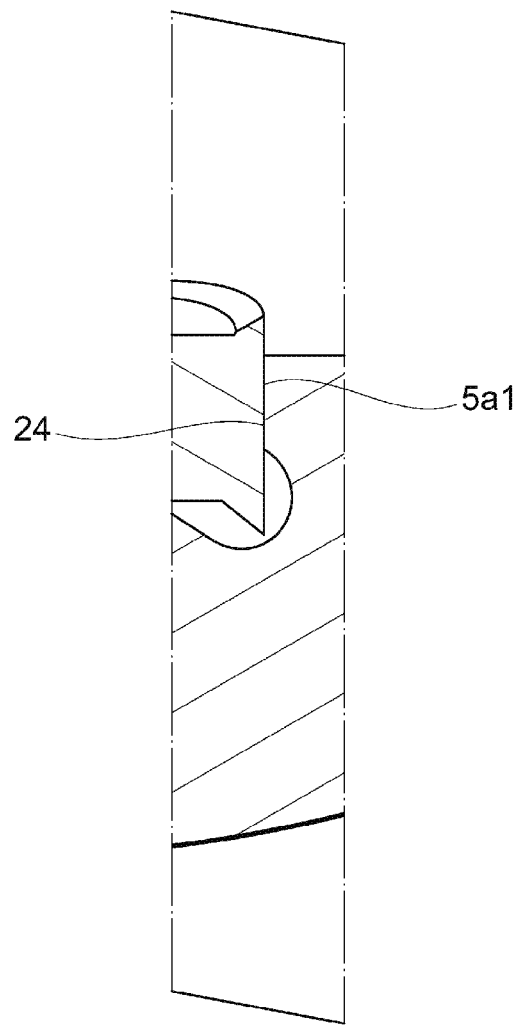
FIG. 18 is a cross-sectional view taken along XVIII-XVIII of FIG. 16.
Figure 19:
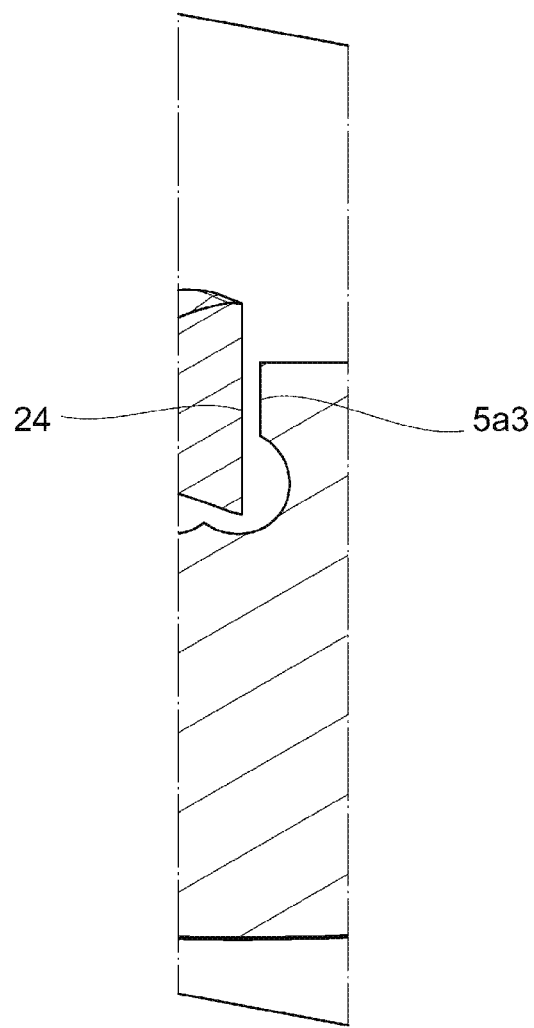
FIG. 19 is a cross-sectional view taken along XIX-XIX of FIG. 16.

When the cutting insert 21 is mounted such that one of the cutting edges 25 formed in the first end surface 22 is involved in cutting, the second end surface 23 of the cutting insert 21 comes into contact with the bottom wall surface 4 of the insert seat 2, and the peripheral side surface 24 of the cutting insert 21 comes into contact with the side wall surface 5 of the insert seat 2. As to the contact between the peripheral side surface 24 and the side wall surface 5, the peripheral side surface 24 comes into contact with the second side wall surface 5b in its entirety. Meanwhile, with regard to the first side wall surface 5a, as shown in FIGS. 17 to 19, the peripheral side surface 24 comes into contact with the first surface portion 5a1 only. In other words, the peripheral side surface 24 does not come into contact with the second surface portion 5a2 and the third surface portion 5a3 of the first side wall surface 5a. A portion of the peripheral side surface 24 which comes into contact with the first surface portion 5a1 is a curved side surface portion of the substantially semicircular portion 28.

The operation and effects of the above-described tool body 1 and the above-described indexable rotary cutting tool 31 having the cutting inserts 11, 21 mounted thereon will be described below.

Configuring the first side wall surface of the insert seat 2 as described above, it becomes possible to mount, on the same tool body 1, both the cutting insert 11 having an edge shape for use in high-feed machining and the cutting insert 21 having an edge shape for use in a radius cutter.

More specifically, when mounting, on the tool body 1, the cutting insert 11 having an edge shape for use in high-feed machining, a portion of the peripheral side surface 14 which is located on the shorter-side of the cutting insert 11 and the second surface portion 5a2, being a flat surface, of the first side wall surface 5a, come into contact with each other. This shorter-side portion of the peripheral side surface 14 is a flat surface corresponding to the linear cutting edge (major cutting edge) 15a formed in the first end surface 12 or the second end surface 13 and thus comes into contact with the second surface portion 5a2, being a flat surface. Accordingly, the cutting insert 11 can sufficiently and firmly make contact with the first side wall surface 5a, and therefore, the cutting insert 11 can be fixed rigidly.

Meanwhile, when mounting, on the tool body 1, the cutting insert 21 having an edge shape for use in a radius cutter, a portion of the peripheral side surface 24 which is located on the shorter-side of the cutting insert 21 and the first surface portion 5a1, being a curved surface, of the first side wall surface 5a, come into contact with each other. This portion of the peripheral side surface 24 is a curved surface corresponding to the circular-arc-shaped cutting edge 25a formed in the first end surface 22 or the second end surface 23 and thus comes into contact with the first surface portion 5a1, being a curved surface. Accordingly, the cutting insert 21 can sufficiently and firmly make contact with the first side wall surface 5a, and therefore, the cutting insert 21 can be fixed rigidly.

Further, when each of the two types of cutting inserts 11, 21 is mounted on the insert seat 2, a flat portion of each of the peripheral side surfaces 14, 24 of the respective cutting inserts 11, 21 (a side surface portion adjacent to the substantially linear portion 19 or a side surface portion adjacent to the substantially linear portion 29) is brought into contact with the second side wall surface 5b.

As described above, in the present embodiment, the two types of cutting inserts 11, 21 respectively having different shapes of portions which come into contact with the side wall surface 5a of the insert seat 2 can be mounted rigidly on the one type of tool body 1. Accordingly, the cost and labor for maintaining the tool body can be reduced significantly.

In the present embodiment, one of the cutting inserts, i.e., the cutting insert 11, is for use in high-feed machining while the other cutting insert, i.e., the cutting insert 21, is for use in a radius cutter. However, the configuration is not limited thereto. In other words, regarding the two types of cutting inserts, cutting inserts involving different applications from those in the case of the present embodiment or cutting inserts involving different outer shapes therefrom may be employed, as long as, as to one of such cutting inserts, a portion of a peripheral side surface thereof which comes into contact with the first side wall surface 5a is a curved surface while, as to the other cutting insert, a portion of a peripheral side surface thereof which comes into contact with the first side wall surface 5a is a flat surface. For example, as to the first cutting insert, it is possible to employ a cutting insert for use in square shoulder milling which has a substantially rectangular outer shape in a plan view, i.e., a top view. However, in consideration of the continuity in mold making from roughing to finishing, it is preferable that, while one of the cutting inserts, i.e., the cutting insert 11, is for use in high-feed machining, the other cutting insert, i.e., the cutting insert 21, is for use in a radius cutter. Further, the cutting insert 21 may be used not only for a radius cutter but also for a ball end mill. A ball end mill is also used suitably for the finishing of a three-dimensional shape.

Further, in the present embodiment, the cutting inserts 11 and 21 are double-sided use cutting inserts. However, such cutting inserts are not limited to being of such type, and one-sided use type cutting inserts may be employed instead. In other words, it is possible to employ a configuration in which the cutting edges 15, 25 are formed in only either the first end surfaces 12, 22 or the second end surfaces 13, 23. In such case, the cutting inserts may be so-called positive type cutting inserts in which a portion (flank) of a peripheral side surface thereof adjacent to the cutting edge is given a positive clearance angle. Even in the case of the above-described one-sided use type cutting inserts, one of the cutting inserts is required to have a flat portion of a peripheral side surface which is capable of coming into contact with the second surface portion 5a2 of the insert seat 2 whereas the other cutting insert is required to have a curved portion of a peripheral side surface which is capable of coming into contact with the first surface portion 5a1 of the insert seat 2.

Figure 20:
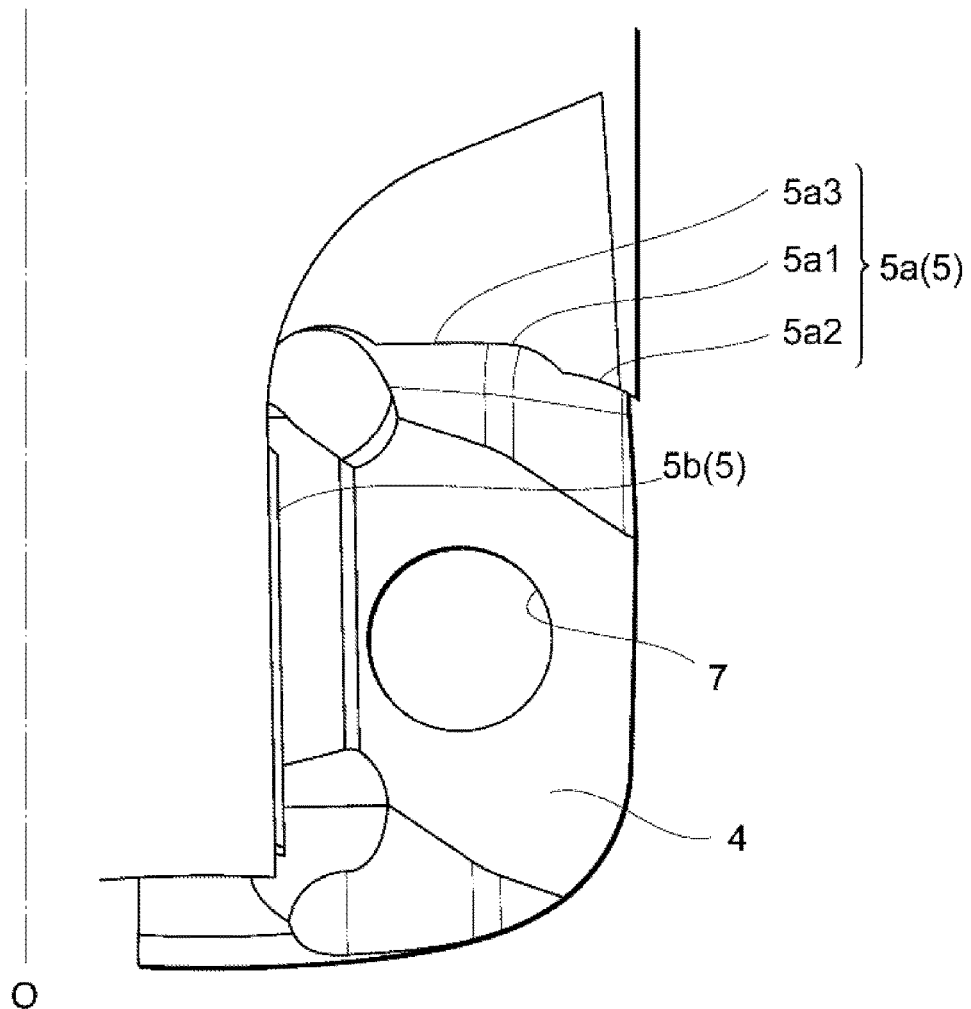
FIG. 20 is another enlarged side view of an insert seat and its peripheral part in the tool body shown in FIGS. 1 to 3, the view seen from a direction perpendicularly facing a bottom surface of the insert seat.

In the present embodiment, the major cutting edge of the first cutting insert 11 is the linear cutting edge 15a, but such major cutting edge is not limited thereto. In other words, the major cutting edge of the cutting insert 11 may be circular-arc shaped so as to be slightly curved outwards in a plan view. This is because cutting inserts for use in high-feed machining include cutting inserts whose major cutting edge is circular-arc shaped so as to be slightly curved outwards in a plan view. The term "slightly curved" herein refers to a curvature radius greater than that of the circular-arc-shaped cutting edge 25a of the second cutting insert 21 for use in a radius cutter. When the first cutting insert 11 has a major cutting edge with a greater curvature radius in the above-described manner, a portion of the peripheral side surface 14 which is adjacent to the major cutting edge formed in the first or second end surface 12, 13 is a curved surface corresponding to the shape of the major cutting edge. Accordingly, in such case, the second surface portion 5a2 which comes into contact with the above curved surface is also a curved surface, but the configuration is, as a matter of course, such that the curvature radius of the curved surface of the second surface portion 5a2 is greater than the curvature radius of the first surface portion 5a1. See FIG. 20. However, from the viewpoint of the ease of machining, the configuration is preferably such that the second surface portion 5a2 is a flat surface, and therefore, it is preferable that the major cutting edge of the first cutting insert 11 is also the linear cutting edge 15a.

In the present embodiment, the first side wall surface 5a having the first surface portion 5a1 and the second surface portion 5a2 is arranged at a position facing toward the leading end 8 of the tool body 1. However, the configuration is not limited thereto, and the first side wall surface 5a may instead be arranged at a position facing the outer periphery of the tool body 1. In such case, the second side wall surface 5b is arranged so as to face toward the leading end 8 of the tool body 1. However, as described above, in the case of using a cutting insert for use in high-feed machining and a cutting insert for use in a radius cutter, the flat or curved contact surface is located in a direction corresponding to the rotational axis O, and thus, as in the present embodiment, the configuration is desirably such that the first side wall surface 5a having the first surface portion 5a1 and the second surface portion 5a2 is arranged at a position facing toward the leading end 8 of the tool body 1.

The tool body 1 of the present embodiment is configured such that, in the first side wall surface 5a, only the second surface portion 5a2 comes into contact with the first cutting insert 11, but the configuration is not limited thereto. In other words, the configuration may be such that not only the second surface portion 5a2 but also the third surface portion 5a3 comes into contact with the cutting insert 11, or the configuration may be such that only the third surface portion 5a3, not the second surface portion 5a2, comes into contact with the cutting insert 11. However, taking manufacturing tolerances into consideration, it is difficult for the cutting insert 11 to appropriately come into contact with both the second surface portion 5a2 and the third surface portion 5a3, and variations may occur in the mounting accuracy. Accordingly, the first cutting insert 11 preferably comes into contact with only either the second surface portion 5a2 or the third surface portion 5a3.

When the cutting insert 11 comes into contact with only either the second surface portion 5a2 or the third surface portion 5a3, it is preferable that the cutting insert 11 comes into contact with the second surface portion 5a2 located closer to the outer periphery than the third surface portion 5a3, and it is also preferable that the second surface portion 5a2 approaches the leading end 8, heading to the outer periphery. This is because, with the above configuration, the second surface portion 5a2 is projected toward the outer periphery, whereby the cutting insert 11 can be supported firmly from the outer periphery side. Accordingly, even if cutting resistance (a principal component of force) in the direction of rotation around the fastening screw (clamping member) 32 is applied on the active cutting edge 15 of the first cutting insert 11, shifting of the cutting insert 11 can be suppressed.

In the present embodiment, the first side wall surface 5a is constituted by the first surface portion 5a1, the second surface portion 5a2 and the third surface portion 5a3, but the configuration is not limited thereto. In other words, surface portions other than the above surface portions may be additionally provided in the first side wall surface 5a, or it is also possible to employ the configuration of not including the third surface portion 5a3. Further, when other surface portions are additionally provided, they may be formed between the first surface portion 5a1 and the second surface portion 5a2.

In the tool body 1 of the present embodiment, the first surface portion 5a1 includes substantially the center area of the first side wall surface 5a as viewed from the direction facing the bottom wall surface 4. However, the configuration is not limited thereto, and the first surface portion 5a1 may be located closer to the inner periphery of the first side wall surface 5a (i.e., to the central axis O) or to the outer periphery thereof. However, the first surface portion 5a1 is preferably at the position including substantially the center area of the first side wall surface 5a. This is because the first surface portion 5a1 being at such position allows the curved surface portion of the peripheral side surface 4 which is adjacent to the substantially semicircular portion 28 of the cutting insert 21 to be held reliably, from the right and left sides, in the first surface portion 5a1 in a recessed shape, whereby shifting of the cutting insert 21 in a radial direction of the tool can be suppressed firmly.

In the present embodiment, the threaded hole 7 is formed at substantially the center of the bottom wall surface 4 of the insert seat 2, and the distance from a center of the threaded hole 7 to the first side wall surface 5a is longer than the distance from the center of the threaded hole 7 to the second side wall surface 5b. The term "distance" herein refers to the shortest length from the center of the threaded hole 7 to the first side wall surface 5a or the second side wall surface 5b. However, in the present invention, the configuration is not limited thereto, and it is also possible to employ, for example, a configuration in which the distance from the center of the threaded hole 7 to the first side wall surface 5a is equal to the distance from the center of the threaded hole 7 to the second side wall surface 5b. However, it is preferable to employ a configuration in which the distance from the center of the threaded hole 7 to the first side wall surface 5a is longer than the distance from the center of the threaded hole 7 to the second side wall surface 5b. This is because, since the cutting inserts 11, 21, each of which matches the insert seat 2 having the above-described configuration, each have a vertically long shape, distances can respectively be maintained between the mounting holes 16, 26 and the cutting edges 15, 25. Accordingly, the cutting inserts 11, 21 can each be imparted with strength sufficient to withstand cutting resistance. Further, due to the cutting inserts 11, 21, each having a vertically long shape, shifting of the cutting inserts 11, 21 in a rotating manner can further be suppressed even if cutting resistance (a principal component of force) in the direction of rotation around the fastening screw (clamping member) 32 is applied on the cutting inserts 11, 21.

The tool body 1 according to an embodiment of the present invention may be used suitably in an indexable end mill and an indexable face milling cutter. However, the rotary tool is not limited thereto, and the present invention can also be applied to other types of rotary tools, such as an indexable drill and an indexable reamer. The present invention can further be applied to turning tools.

The present embodiment employs two types of cutting inserts 11, 21, but the configuration is not limited thereto. It is also possible to employ a configuration in which three or more types of cutting inserts can be mounted on a single tool body.

Although representative embodiments of the present invention have been described above, the present invention is not limited to such embodiments. Various modifications may be made to the present invention, and any replacements and modifications thereof may be made without departing from the spirit and scope of the invention defined in the scope of the claims of the present application.

REFERENCE SIGNS LIST

1 Tool body
2 Insert seat
3 Chip pocket
4 Bottom wall surface
5 Side wall surface
5a First wall surface (first side wall surface)
5a1 First surface portion
5a2 Second surface portion
5a3 Third surface portion
5b Second wall surface (second side wall surface)
6 Recessed part
7 Threaded hole
8 Leading end
9 Base end
11 First cutting insert
12 First end surface
13 Second end surface
14 Peripheral side surface
15 Cutting edge
15a Linear cutting edge (major cutting edge)
15b Curved cutting edge (minor cutting edge)
16 Mounting hole
17 Substantially quadrangular portion
18 Substantially triangular portion
18a Oblique side
18b Base
18c Connecting part
19 Substantially linear portion
21 Second cutting insert
22 First end surface
23 Second end surface
24 Peripheral side surface
25 Cutting edge
25a Circular-arc-shaped cutting edge
25b Linear cutting edge
26 Mounting hole
27 Substantially quadrangular portion
28 Substantially semicircular portion
29 Substantially linear portion
31 Indexable rotary cutting tool
32 Clamping member

What is claimed is:

1. A tool body which has at least one insert seat and on which cutting inserts having different shapes are capable of being mounted, wherein:
   the insert seat comprises a bottom wall surface and a side wall surface and has a configuration in which the bottom wall surface or a surface formed by extending the bottom wall surface and the side wall surface or a surface formed by extending the side wall surface intersect with each other;
   the side wall surface comprises a first side wall surface and a second side wall surface;
   the first side wall surface comprises at least two surface portions which are configured to come into contact with a peripheral side surface of the cutting insert depending on a shape of the cutting insert;
   from among the two surface portions, the first surface portion is a curved surface having a recessed shape recessed toward a base end of the tool body, and the second surface portion is a flat surface or a curved surface having a recessed shape recessed toward the base end of the tool body, with a greater curvature radius than that of the first surface portion;
   the tool body has a rotational axis which is defined so as to penetrate the tool body from a leading end to the base end; and
   the at least two surface portions are configured so as to be placed from the central axis toward the outer periphery or so as to be placed from the central axis toward the leading end.

2. The tool body according to claim 1, wherein:
   the side wall surface has a configuration in which the first side wall surface or a surface formed by extending the first side wall surface and the second side wall surface or a surface formed by extending the second side wall surface intersect with each other;
   the first side wall surface faces toward the leading end of the tool body; and the second side wall surface faces toward an outer periphery of the tool body.

3. The tool body according to claim 2, wherein, when a cutting insert is mounted on the insert seat, in the first side wall surface, only one of the two surface portions comes into contact with the cutting insert.

4. The tool body according to claim 3, wherein the second surface portion is located closer to the outer periphery than the first surface portion and the second surface portion is inclined relative to the central axis such that a portion of the second surface portion closest to the outer periphery of the tool approaches the leading end of the tool body.

5. The tool body according to claim 2, wherein the first surface portion is arranged at a position encompassing substantially a center area of the first side wall surface in a direction substantially perpendicularly intersecting with the central axis as the insert seat is viewed from a direction facing the bottom wall surface.

6. The tool body according to claim 3, wherein:
the tool body has a threaded hole at substantially a center of the bottom wall surface; and
a distance from a center of the threaded hole to the first side wall surface is longer than a distance from the center of the threaded hole to the second side wall surface.

7. A cutting tool comprising the tool body according to claim 1 and a cutting insert removably mounted on the insert seat, wherein:
the cutting insert has a first end surface, a second end surface which is arranged so as to oppose the first end surface, and a peripheral side surface which extends between the first and second end surfaces;
an intersecting edge between the first end surface and the peripheral side surface is provided with a cutting edge; and
a portion of the peripheral side surface comes into contact with the second surface portion of the first side wall surface of the insert seat.

8. The cutting tool according to claim 7, wherein the portion of the peripheral side surface is a flat surface.

9. The cutting tool according to claim 7, wherein the cutting edge has a major cutting edge and a minor cutting edge.

10. The cutting tool according to claim 9, wherein a corner angle formed by the major cutting edge and the minor cutting edge is from 60 degrees to 80 degrees.

11. The cutting tool according to claim 7, wherein the first end surface and the second end surface are elongated relative to the peripheral side surface.

12. A cutting tool comprising the tool body according to claim 1 and a cutting insert removably mounted on the insert seat, wherein:
the cutting insert has a first end surface, a second end surface which is arranged so as to oppose the first end surface, and a peripheral side surface which extends between the first and second end surfaces;
an intersecting edge between the first end surface and the peripheral side surface is provided with a cutting edge; and
a portion of the peripheral side surface comes into contact with the first surface portion of the first side wall surface of the insert seat.

13. The cutting tool according to claim 12, wherein the cutting edge has a circular-arc-shaped cutting edge having a circular-arc shape.

14. The cutting tool according to claim 13, wherein the cutting insert is for use in a radius cutter or a ball end mill.

15. The cutting tool according to claim 12, wherein the first end surface and the second end surface are elongated relative to the peripheral side surface.

* * * * *